Patented Nov. 5, 1946

2,410,635

UNITED STATES PATENT OFFICE 2,410,635

HEAT STABLE COMPOSITIONS

John Kenneth Craver, Webster Groves, Mo., assignor to Monsanto Chemical Company, St. Louis, Mo., a corporation of Delaware No Drawing. Application March 3, 1945,
Serial No. 580,935

11 Claims. (Cl. 106—316)

This invention relates to heat stable compositions and more particularly to heat stabilized compositions composed of aryl sulfonamides and aryl sulfones.

Aryl sulfonamides such as benzene sulfonamides, toluene sulfonamides and their N-alkyl derivatives are known to be relatively unstable under the influence of heat. This is true even when the sulfonamides are substantially free from impurities. The aryl sulfonamides have been found to possess the tendency of darkening in color even upon standing at room temperature and the phenomenon is greatly accelerated at temperatures above room temperature. When the sulfonamides are exposed to heat stability tests, the compounds turn dark and the decomposition appears to progress rapidly. Aryl sulfonamides, which have thus undergone decomposition, are greatly lessened in value and rendered useless for many purposes for which the substances are normally used. This is particularly true when the sulfonamides are employed as plasticizers or extenders for cellulose esters, synthetic and protein coating compositions.

One of the objects of the present invention is to provide heat-stabilized compositions composed of certain aryl sulfonamides and certain aryl sulfones.

A further object is to provide a process for heat stabilizing certain aryl sulfonamides.

Further objects will become apparent from the following description and examples.

The composition of the present invention, generally stated, comprises a blended mixture of at least one aryl sulfonamide of the formula type

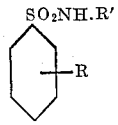

in which R is a residue selected from the group consisting of hydrogen and methyl and R' is a residue selected from the group consisting of hydrogen, alkyl radicals having from 1 to 8 carbon atoms and cyclo-alkyl radicals having from 3 to 6 carbon atoms; and an aryl sulfone of the formula type

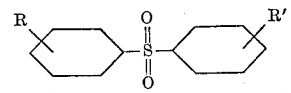

in which R and R' are residues selected from the group consisting of hydrogen and methyl.

Among the aryl sulfonamides employed in the preparation of the heat-stable compositions of the present invention are the following: benzene sulfonamide and ortho- and para-toluene sulfonamides, and the following N-alkyl derivatives of these sulfonamides, such as the methyl, ethyl, propyl, isopropyl, butyl isobutyl, amyl, isoamyl, hexyl, heptyl, octyl and ethylhexyl derivatives, and N-cycloalkyl derivatives such as the cyclopropyl, cyclobutyl and cyclohexyl derivatives. Mixtures of two or more of the aforedescribed aryl sulfonamides may also be employed for the purpose of the present invention. Moreover, in the case of mixtures of the ortho- and para-isomers of the aryl sulfonamides such as the ortho- and para-toluene sulfonamides, the ortho- and para-isomers may be present in any desired proportions.

Among the aryl sulfones employed in the preparation of the heat stable compositions of the present invention are the following: diphenyl sulfone and the ortho- and para-isomers of ditolyl sulfone. Mixtures of the ortho- and para-isomers of the aforedescribed sulfones may vary over a wide range of proportions. Mixtures of two or more of the aforedescribed sulfones, together with ortho- and para-isomers thereof, may be employed.

The heat stable compositions of the present invention are prepared by blending the aryl sulfonamides and the aryl sulfones in any desired manner, as for example by adding the sulfones to the sulfonamides and agitating the mixture until uniform dispersion of the components is effected. The quantity of aryl sulfone to be blended with aryl sulfonamides to provide the heat stable compositions of the present invention may range from 1 to 15% by weight of the composition. The desired range is 5 to 15%. When substantially pure aryl sulfonamides are employed, the amount of sulfone required to provide a heat stable composition may range in some instances from 1 to 10%. When impure sulfonamides are employed, the amount of sulfone required for the purpose is likely to be in the range of 5 to 15%. In general, no substantial improvement of the heat stability of the composition is effected when the amount of sulfone present in the composition is increased above about 15%. The sulfones employed in the preparation of the novel compositions of the present invention are solids at room temperature. It is one of the features of this invention that these sulfones impart heat-stability to the sulfonamides described herein when the sulfones are present in the compositions of the present invention in amounts insufficient to give rise to incompatibility in plastic compositions in which the compositions of the present invention may be used. The sulfone content of the heat stable compositions of the present invention may be provided during the formation of the aryl sulfonamide by a suitable selection of operating conditions, which under normal circumstances are usually controlled to avoid the formation of sulfones.

The heat stable compositions of the present invention possess substantially the properties or characteristics of the aryl sulfonamides themselves, with the exception that the compositions are stable to the effect of heat and do not decompose as the result of exposure to temperatures ranging from room temperature to 200° C. and higher. When the heat stable compositions of the present invention are employed as plasticizers, for example for cellulose esters, the amount of aryl sulfones present in the plasticized ester as the result of their existence in the heat stable compositions of the present invention are far less than the quantity of aryl sulfones required to effect any appreciable degree of plasticizing action on the ester.

The following examples will serve to illustrate the novel compositions and process of the present invention. These examples are to be construed merely as illustrative and not as limiting the invention.

*Example I*

To 95 g. of benzene sulfonamide was added 5 g. of diphenyl sulfone. The mixture was heated to 153° C. and agitated until a uniform blend of the components was obtained.

*Example II*

A mixture of 65 parts N-isopropylbenzene sulfonamide, 25 parts of N-isopropyl- p-toluene sulfonamide and 10 parts of a mixture of ortho- and para-ditolyl sulfone was heated to 50° C. and agitated to provide a uniform blend of the components.

Compositions prepared as described in the foregoing examples as well as others prepared according to the procedure in those examples, together with specimens of the corresponding aryl sulfonamides containing substantially no aryl sulfones were tested for heat stability and the specimens were thereafter compared with known color standards. The heat stability test was performed by inserting the respective compositions and sulfonamides into 13 mm. diameter test tubes and immersing the test tubes for one hour in an agitated oil bath maintained at 205° C. The temperature was selected because it provides a practical safety factor above any temperature to which the composition is likely to be exposed in molding operations where the compositions are used as plasticizers or softening agents for cellulose esters, synthetic resins and protein coating compositions. The time selected for the test provides a practical safety factor in excess of the time during which the composition is likely to be subjected to such temperatures. A measure of the extent of decomposition developed in the composition when subjected to the heat test is provided according to the practice in this art by color comparison with known color standards. The color standards employed for comparison were those known as the Gardner color standards. These standards were employed in conjunction with a comparator of the Hellige type in the manner known to those skilled in the art. The color is reported in terms of the Gardner number of the respective standards used for the comparison. By these standards the compositions prior to subjection to the heat test range in color from G-1 to G-10. Moreover, the color may vary within this range depending upon the impurities present. The following table shows the results of the tests:

| No. | Composition or substance | Per cent sulfone | Heat stability (Gardner color std.) | Rating |
|---|---|---|---|---|
| 1 | Benzene sulfonamide | 0 | G-15 | Very poor. |
| 2 | Benzene sulfonamide; diphenyl sulfone | 8 | G-7 | Good. |
| 3 | N-isopropylbenzene sulfonamide | 0 | G-18 | Very poor. |
| 4 | N-isopropylbenzene sulfonamide; diphenyl sulfone | 1 | G-12 | Fair. |
| 5 | ----do---- | 5 | G-10 | Good. |
| 6 | ----do---- | 8 | G-5 | Very good. |
| 7 | ----do---- | 10 | G-2 | Do. |
| 8 | ----do---- | 15 | G-2 | Do. |
| 9 | N-butylbenzene sulfonamide | 0 | G-18 | Do. |
| 10 | N-butylbenzene sulfonamide; diphenyl sulfone | 10 | G-10 | Good. |
| 11 | p-Toluene sulfonamide | 0 | G-15 | Poor. |
| 12 | p-Toluene sulfonamide; diphenyl sulfone | 10 | G-10 | Good. |
| 13 | N-methyl-p-toluene sulfonamide | 0 | G-15 | Poor. |
| 14 | N-methyl-p-toluene sulfonamide; diphenyl sulfone | 10 | G-10 | Good. |
| 15 | N-ethyl-p-toluene sulfonamide | 0 | G-15 | Poor. |
| 16 | N-ethyl-p-toluene sulfonamide; diphenyl sulfone | 12 | G-12 | Fair. |
| 17 | N-isopropyl-p-toluene sulfonamide | 0 | G-18 | Very poor. |
| 18 | N-isopropyl-p-toluene sulfonamide; diphenyl sulfone | 5 | G-10 | Good. |
| 19 | ----do---- | 10 | G-8 | Do. |
| 20 | N-cyclohexyl benzene sulfonamide | 0 | G-14 | Poor. |
| 21 | N-cyclohexyl benzene sulfonamide; diphenyl sulfone | 10 | G-10 | Good. |
| 22 | 70% N-isopropylbenzene sulfonamide; 30% N-isopropyl-o- and p-toluene sulfonamides | 0 | G-12 | Fair. |
| 23 | 70% N-isopropylbenzene sulfonamide; 30% N-isopropyl-o- and p-toluene sulfonamides; mixture of the o- and p-ditolyl sulfones. | 8 | G-8 | Good. |
| 24 | 70% N-isopropylbenzene sulfonamide; 30% N-isopropyl toluene sulfonamide containing 80% para and 20% ortho isomers. | 0 | G-15 | Poor. |
| 25 | 70% N-isopropylbenzene sulfonamide; 30% N-isopropyl toluene sulfonamide containing 80% para and 20% ortho isomers; mixture of o- and p-ditolyl sulfones. | 12 | G-8 | Good. |

It is observed from the foregoing data that the compositions of the present invention are remarkably stable to heat under conditions to which they are likely to be exposed in use as plasticizers and softening agents for cellulose esters, synthetic resins and protein coating compositions. The sulfonamides alone on the other hand were all poor in stability at the temperature and for the time of the test.

While the compositions of the present invention have been described and illustrated in the foregoing specifications and examples, it is to be observed that the present invention is not to be construed as being limited in respect to any particular substances, proportions, conditions or combinations except as defined in the claims.

I claim:

1. A heat-stabilized composition comprising at least one aryl sulfonamide of the formula type

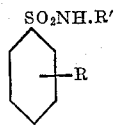

in which R is a radical selected from the group consisting of hydrogen and methyl, and R' is a radical selected from the group consisting of hydrogen, alkyl radicals having from 1 to 8 carbon atoms and cycloalkyl radicals having from 3 to 6 carbon atoms; and from 1 to 15%, by weight of the composition, of at least one aryl sulfone of the formula type

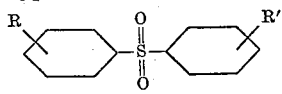

in which R and R' are radicals selected from the group consisting of hydrogen and methyl.

2. A heat-stabilized composition comprising at least one aryl sulfonamide of the formula type

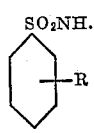

in which R is a radical selected from the group consisting of hydrogen and methyl, and R' is a radical selected from the group consisting of hydrogen, alkyl radicals having from 1 to 8 carbon atoms and cycloalkyl radicals having from 3 to 6 carbon atoms; and from 5 to 15%, by weight of the composition, of at least one aryl sulfone of the formula type

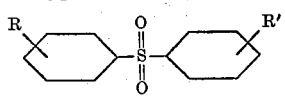

in which R and R' are radicals selected from the group consisting of hydrogen and methyl.

3. A heat-stabilized composition comprising N-isopropyl benzene sulfonamide and from 1 to 15% of diphenyl sulfone.

4. A heat-stabilized composition comprising N-isopropyl benzene sulfonamide and from 5 to 15% of diphenyl sulfone.

5. A heat stabilized composition comprising N-isopropyl benzene sulfonamide, N-isopropyl p-toluene sulfonamide and from 1 to 15% of a mixture of diphenyl sulfone and ortho- and para-isomers of di-tolyl sulfone.

6. A heat stabilized composition comprising N-isopropyl benzene sulfonamide, N-isopropyl p-toluene sulfonamide and from 5 to 15% of a mixture of diphenyl sulfone and ortho- and para-isomers of di-tolyl sulfone.

7. A heat-stabilized composition comprising N-isopropyl benzene sulfonamide, N-isopropyl p-toluene sulfonamide, N-isopropyl o-toluene sulfonamide and from 1 to 15% of a mixture of diphenyl sulfone, o-di-tolyl sulfone and p-di-tolyl sulfone.

8. A heat-stabilized composition comprising N-isopropyl benzene sulfonamide, N-isopropyl p-toluene sulfonamide, N-isopropyl o-toluene sulfonamide and from 5 to 15% of a mixture of diphenyl sulfone, o-di-tolyl sulfone and p-di-tolyl sulfone.

9. A heat-stabilized composition comprising 70% of N-isopropyl benzene sulfonamide, 30% of ortho- and para-isomers of N-isopropyl toluene sulfonamide and from 1 to 15% of a mixture of diphenyl sulfone, o-di-tolyl sulfone and p-di-tolyl sulfone.

10. A heat-stabilized composition comprising 70% of N-isopropyl benzene sulfonamide, 30% of ortho- and para-isomers of N-isopropyl toluene sulfonamide and from 5 to 15% of a mixture of diphenyl sulfone, o-di-tolyl sulfone and p-di-tolyl sulfone.

11. A process for preparing a heat-stable composition comprising mixing at least one aryl sulfonamide of the formula type

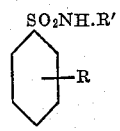

in which R represents a radical selected from the group consisting of hydrogen and methyl, and R' represents a radical selected from the group consisting of hydrogen, alkyl radicals having from 1 to 8 carbon atoms and cycloalkyl radicals having from 3 to 6 carbon atoms; with from 1 to 15% of at least one aryl sulfone of the formula type

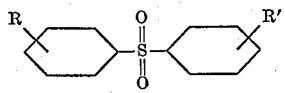

in which R and R' represent radicals selected from the group consisting of hydrogen and methyl; heating and agitating the mixture until a homogeneous solution is formed and subsequently allowing the mixture to cool.

JOHN KENNETH CRAVER.